July 22, 1969

M. R. KULINA 3,456,992

VIBRATION DAMPING DEVICE

Filed April 7, 1967

INVENTOR.
MARK ROBERT KULINA
BY
William V. Eba
his ATTORNEY

United States Patent Office 3,456,992
Patented July 22, 1969

3,456,992
VIBRATION DAMPING DEVICE
Mark R. Kulina, Franklin Lakes, N.J., assignor to Curtiss-Wright Corporation, a corporation of Delaware
Filed Apr. 7, 1967, Ser. No. 629,181
Int. Cl. F16c 35/00, 19/06, 13/02
U.S. Cl. 308—9
10 Claims

ABSTRACT OF THE DISCLOSURE

A resiliently supported retainer is provided for the bearing of a shaft, and motion of such retainer is damped both hydraulically and by means of enforced frictional engagement of fluid sealing rings with the retainer to thereby limit vibrations of the shaft at resonant speeds.

Background of the invention

My invention relates to vibration damping devices, and more particularly, to devices for damping the vibrations of a rotating shaft.

Excessive vibrations in rotating machinery at critical speeds has always been a problem. One approach to the solution of this problem is to design the machinery so that the critical speeds at which resonant vibrations occur are above the operating speed range of the machinery. Another approach is to select masses and stiffnesses so that one or more critical speeds is below and the remainder are above the operating speed range, although this solution poses the problem of operating through the critical speed range to attain normal operating speeds, and under certain conditions this may be undesirable. In the case of high thrust-to-weight ratio machinery with a wide operating speed range, neither approach may provide a satisfactory solution to the problem of resonant vibrations. In such a case, design requirements may necessitate damping vibrations at critical speeds.

Summary of the invention

This invention is directed to providing an improved arrangement for supporting a shaft and effectively damping vibrations at critical speeds.

It is an object of the invention to provide a flexible bearing support for a shaft and hydraulically controllable damping means for effectively reducing resonant vibrations of the bearing and shaft at critical shaft speeds.

Another object of the invention is to provide hydraulic and friction damping means effective to suitably limit vibrations of a shaft throughout its operating speed range.

Other objects and advantages of the invention will become apparent during a reading of the specification taken in connection with the accompanying drawings.

Description of the preferred embodiment

Figure 1:
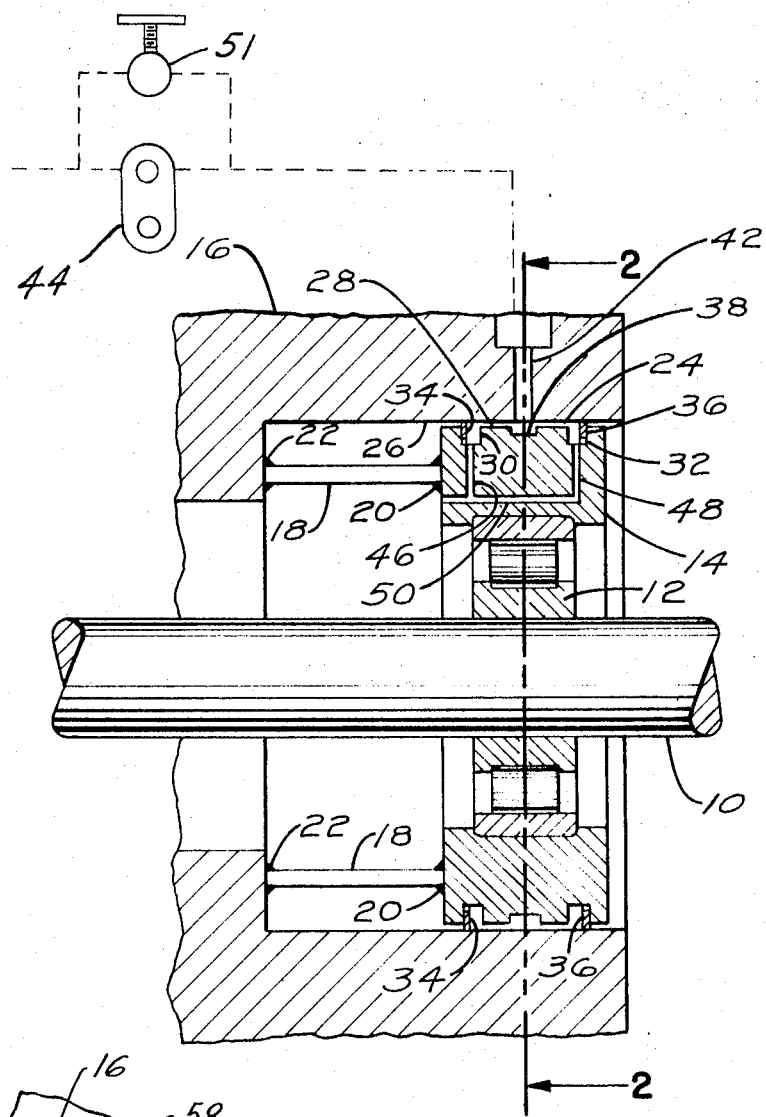
FIG. 1 is a longitudinal sectional view through shaft damping and supporting means arranged according to the invention.

Referring to the drawings, reference character 10 designates a shaft which is rotatably supported in a bearing 12. The bearing 12, although shown as a roller bearing may be a ball bearing or it may be otherwise suitably constructed to rotatably support shaft 10. Bearing 12 is supported in a ring-like retaining member 14 which is flexibly secured within a fixed cylindrical housing 16 as by a squirrel cage comprising rods 18. As shown, the rods 18 which are equiangularly arranged about the shaft 10 are secured by welds at 20 and 22 to member 14 and the fixed housing 16 respectively. However, any other suitable means might be employed for affixing the rods at opposite ends to member 14 and housing 16. The squirrel cage consisting of rods 18 centrally locates member 14 in housing 16 leaving an annular cavity 24 between the inner surface 26 of the housing and outer periphery 28 of member 14.

Member 14 is provided with slots 30 and 32 which contain sealing rings 34 and 36 respectively. Another annular slot 38 is provided in the member 14 between slots 30 and 32 as shown. A supply conduit 42 located in the housing and aligned with slot 38 connects with annular cavity 24.

A suitable liquid such as lubricating oil is constantly supplied under pressure by a pump 44 to the annular cavity 24 through supply conduit 42, and sealing rings 34 and 36 are forced by pressure of the liquid against the sides of slots 30 and 32 as shown to seal the ends of cavity 24. Passages 46 and 48, and a drain line 50 connecting with the passages are provided in member 14 to permit liquid to escape from cavity 24. As shown, the passages 46 and 48 connect with slots 30 and 32 respectively, however, they might be connected to slot 38 instead, or otherwise suitably connected to communicate with cavity 24. An adjustable pressure relief valve 51 or other suitable control means is provided to render the pressure of the fluid in cavity 24 controllable.

Bending vibrations of a rotating shaft 10 tending to impart more or less radial movements to the bearing 12 and member 14 are damped by liquid in the annular cavity 24 and by friction between the sealing rings 34 and 36, and the sides of the slots 30 and 32 into which they extend. The damping effect depends upon the pressure under which oil is caused to flow through the cavity 24 and such pressure can be selected to maximize that effect over the speed range of the shaft. Excessive vibration tends to occur at the high end of the speed range if the fluid pressure selected is too high, whereas such vibration tends to occur at the low end of the speed range if the fluid pressure selected is too low. All excessive vibration may, however, be eliminated over the speed range by carefully adjusting the pressure to the proper intermediate value.

As already noted, liquid introduced under pressure into the annular cavity 24 escapes through passages 46 and 48, and the drain line 50. Such liquid flows around the cavity 24 and in so doing cools member 14 and bearing 12. The temperature of the liquid is maintained within fairly narrow limits by the constant flow through cavity 24 and the drain passages 46 and 48. The viscosity of the liquid, therefore, does not greatly change to alter the damping effect of the pressurized liquid to a significant extent as it would in a closed system.

Figure 4:
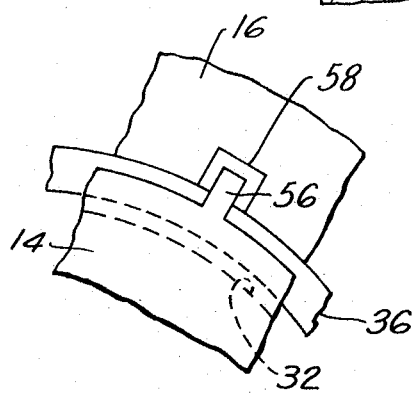
FIG. 4 is an enlarged, fragmentary end view showing a portion of the shaft damping and supporting means as modified to limit torsional movement of a shaft retaining member.
Figure 2:
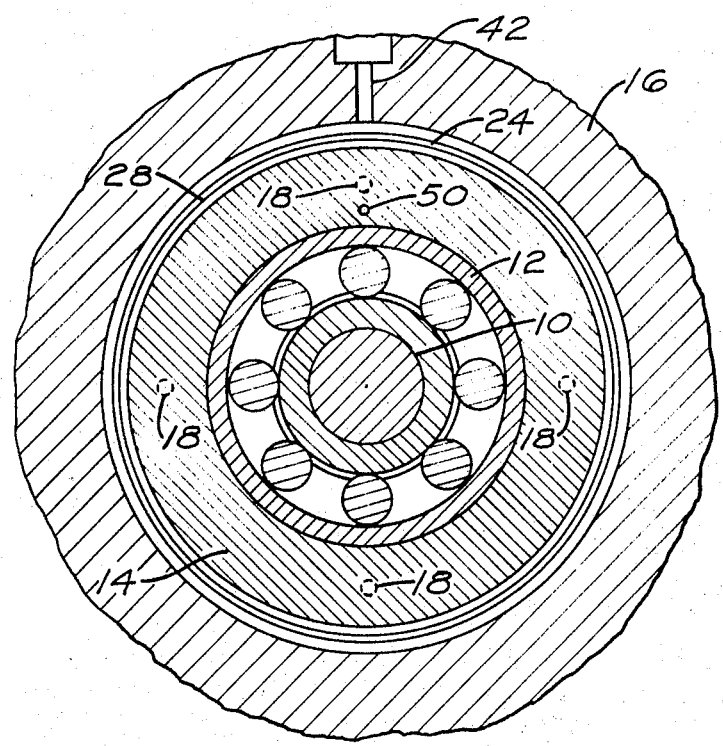
FIG. 2 is a cross-sectional view taken on the plane of the line 2—2 of FIG. 1.
Figure 3:
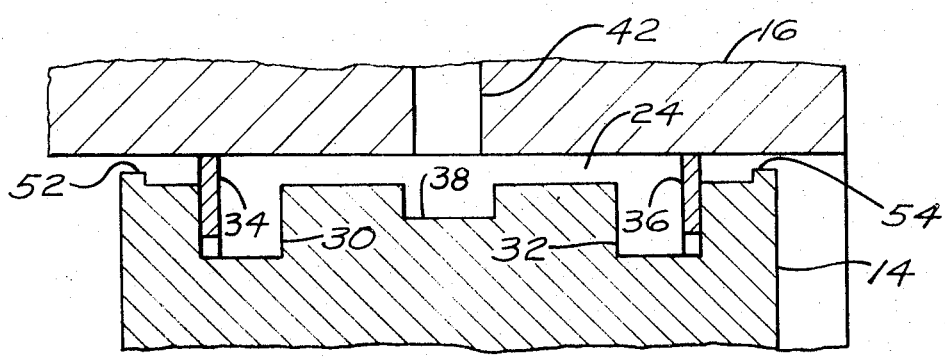
FIG. 3 is an enlarged, fragmentary longitudinal sectional view showing a portion of the shaft damping and supporting means as modified to limit radial movement of the shaft.

Stops may be provided between member 14 and housing 16 to limit the large amplitude of bending vibrations of the shaft such as might result if a sudden unbalance occurs, if the liquid system malfunctions, or the shaft is caused to rotate at speeds outside its normal operating speed range. Such stops may be provided on the member 14 as at 52 and 54 (see FIG. 3), or in the alternative they may be provided on the housing 16. Stops may also be provided to limit torsional movements of member 14, as for example, the stop 56 shown in FIG. 4 on the member 14 and engageable with housing 16 in slot 58.

I claim:

1. A device to damp the vibrations of a rotating shaft comprising a bearing to rotatably support the shaft, rotationally fixed structure, an annular supporting structure for the bearing resiliently connected to the fixed structure, said structures being radially spaced apart, a pair of axially spaced slots in one of the said structures, an annular ring in each slot extending between the supporting structure and the fixed structure defining an enclosed annular space for receiving a liquid under pressure to exert a radially inward force on the supporting structure and to force the rings against the sides of the slots such that the rings by engagement with the sides of the slots frictionally resist movement of the support and the liquid within said space serves to damp lateral vibrations of said support.

2. A device as defined in claim 1 wherein the slots are in the bearing supporting structure.

3. A device as defined in claim 1 and including mechanical means resiliently connecting the bearing supporting structure to the fixed structure.

4. A device as defined in claim 1 wherein the slots are greater in width than the rings such that said liquid can flow from said enclosed annular space into the slots.

5. A device as defined in claim 4 including passage means in said annular supporting structure permitting the escape of liquid introduced into the said enclosed annular space.

6. A device as defined in claim 1 including stop means on at least one of the said structures to limit motion of the bearing support structure toward the fixed structure.

7. A device as defined in claim 1 include stop means on one of the said structures to limit rotational motion of the bearing support structure relative to the fixed structure.

8. The combination of claim 1 including means for varying the pressure of liquid in said enclosed annular space.

9. A device as described in claim 3 and in which said mechanical means includes a plurality of circumferentially spaced rods with each rod being disposed parallel to the axis of said shaft and with each rod being connected at one end to the fixed structure and at the other end to the bearing structure.

10. A device to damp the vibrations of a rotating shaft comprising a bearing to rotatably support the shaft, rotationally fixed structure, an annular supporting structure for the bearing, said fixed and annular supporting structures being radially spaced apart, a pair of axially spaced slots in one of the said structures, an annular ring in each slot extending between the supporting structure and the fixed structure defining an enclosed annular space into which fluid may be introduced to exert a radially inward force on the supporting structure and to force the rings against the sides of the slots such that the rings by engagement with the sides of the slots frictionally resist movement of the bearing supporting structure.

References Cited

UNITED STATES PATENTS

| | | | |
|---|---|---|---|
| 2,618,517 | 11/1952 | Erikson et al. | 308—9 |
| 2,623,353 | 12/1952 | Gerard | 308—9 X |
| 2,964,339 | 12/1960 | Macks | 308—9 X |
| 3,249,390 | 5/1966 | Schwartzman | 308—122 |
| 3,332,726 | 7/1967 | Cooper | 308—9 |

CARROLL B. DORITY, JR., Primary Examiner